United States Patent [19]

Heim et al.

[11] Patent Number: 5,408,785
[45] Date of Patent: Apr. 25, 1995

[54] MOTOR VEHICLE DOOR

[75] Inventors: Gunther Heim, Obertshausen; Bruno Kroll, Radevormwald, both of Germany

[73] Assignee: Ymos Aktiengesellschaft Industrieprodukte, Obertshausen, Germany

[21] Appl. No.: 163,135

[22] Filed: Dec. 7, 1993

[30] Foreign Application Priority Data

Dec. 11, 1992 [DE] Germany .......... 42 41 678.7

[51] Int. Cl.⁶ .................................. B60J 5/04
[52] U.S. Cl. .......................... 49/502; 49/503; 296/146.11
[58] Field of Search .......... 49/502, 503, 506; 296/146.2, 146.5, 146.11, 146.12

[56] References Cited

U.S. PATENT DOCUMENTS

| | | | |
|---|---|---|---|
| 4,512,240 | 4/1985 | Mahler et al. | 49/503 X |
| 4,704,822 | 11/1987 | Srock et al. | 49/506 X |
| 5,127,191 | 7/1992 | Ohta | 49/502 X |
| 5,233,790 | 8/1993 | Bosotti et al. | 49/502 |

*Primary Examiner*—Philip C. Kannan
*Attorney, Agent, or Firm*—W. G. Fasse; W. F. Fasse

[57] ABSTRACT

A motor vehicle door is secured by hinges to a supporting member of a vehicle frame. The door itself has a supporting door frame into which functional door components are installed, and a door outer skin that includes skin components for securing the skin to the door frame. The door frame with its installed functional door components forms a first modular unit. The skin with its components forms a second modular unit. These modular units are releasably secured to one or more door hinge sections independently of each other for independent assembly and repair operations.

18 Claims, 6 Drawing Sheets

MOTOR VEHICLE DOOR

FIELD OF THE INVENTION

The invention relates to a motor vehicle door which is secured by hinges to a supporting member of the vehicle frame. The door itself has a supporting door frame and at least one outer skin section as well as further functional components for properly operating the door.

BACKGROUND INFORMATION

Modern, conventional motor vehicle doors are substantially sheet metal boxes enclosed at least on the outside by a sheet metal outer skin and on the inside by at least one interior sheet metal section that is normally provided with a plurality of large surface openings as needed for the subsequent installation of various functional components of the door. The outer sheet metal cover skin may include a hinge sheet metal member that is secured to the door hinge section which in turn cooperates with a frame hinge section secured to the vehicle frame. The functional door components include, for example, a door lock, a window operating mechanism, and the like, including various auxiliary components, such as handles, pull rods, tilting levers, and the like.

The construction of a motor vehicle requires for economic reasons that the door, which has been equipped with the above mentioned components, is painted or lacquered together with the other vehicle body components. Where the interior components have not yet been installed prior to the paint or lacquering job, the door is removed after such job and its assembly is completed on a separate door assembly line. Especially, the latter approach is involved and hence expensive. Thus, there is room for improvement.

OBJECTS OF THE INVENTION

In view of the foregoing it is the aim of the invention to achieve the following objects singly or in combination:

- to construct a motor vehicle door in such a way that its assembly, including its initial assembly, is simplified by permitting the separate assembly of modular components which are then attached to each other to finish the door;
- to provide the possibility that especially repairs of the door can be performed more economically than was possible heretofore, especially when minor damage to the outer door skin has occurred;
- to facilitate the replacement of individual door components, especially the outer sheet metal skin without the need for replacing an entire door;
- to construct the door modular components in such a way that adjustments for permitted manufacturing tolerances are easily performed; and
- to permit the separate attachment of modular door components to a door hinge section so that any attachment is individually releasable and independent of any other attachment.

SUMMARY OF THE INVENTION

A motor vehicle door according to the invention achieves the above objective in that a supporting door frame and one or several door functional components form a first functional door modular unit, such as an inner unit and that the outer skin with respective skin components, especially those for securing the other skin to the door frame, form a second modular unit, whereby each unit is so constructed that it is releasably secured to the door hinge Section or door hinge sections of the door.

The first modular unit comprises the supporting door frame and, for example, the window operating mechanism as well as the door lock and related components that are necessary for operating the window lifter and the door lock. The second modular unit includes the outer door skin sheet metal and components for connecting the outer door skin to the first mentioned modular unit. Both of these modular units can now be separately assembled which is an important advantage of the invention. Both modular units are releasably secured to the hinge section or sections that form part of the door. Thus, it is now possible to pass the vehicle body together with the outer door modular unit through the lacquering and/or painting operation without the need that door components essential for the door operation are already installed. These components form part of the inner modular unit. According to the invention the final completion of the door merely requires that after the lacquering operation the inner door modular unit is secured to the door hinge section or sections and connected to the outer door modular unit. Similarly, it is now possible to remove the outer door modular unit independently of the inner door modular unit, whereby minor sheet metal damage to the door can be easily repaired without disassembling the entire door. Such repair would merely involve removing the outer skin and replacing the damaged skin by a new outer skin.

Another advantage of the modular construction according to the invention permitting the separate and independent attachment of the modular units to the door hinge sections, is seen in that a wider adjustment range is now possible for adjusting the position of the modular units relative to each other prior to rigidly connecting one unit to the other so that manufacturing tolerances can now be more easily compensated. For this purpose the positioning holes through which attachment elements, such as screws pass, have a larger diameter than the outer diameter of the respective attachment elements. According to another feature of the invention, the door hinge section or sections comprise at least two independent connecting devices, whereby one connecting device is used for securing the inner modular unit while the other connecting device is used for securing the outer modular unit to the door hinge section or sections.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
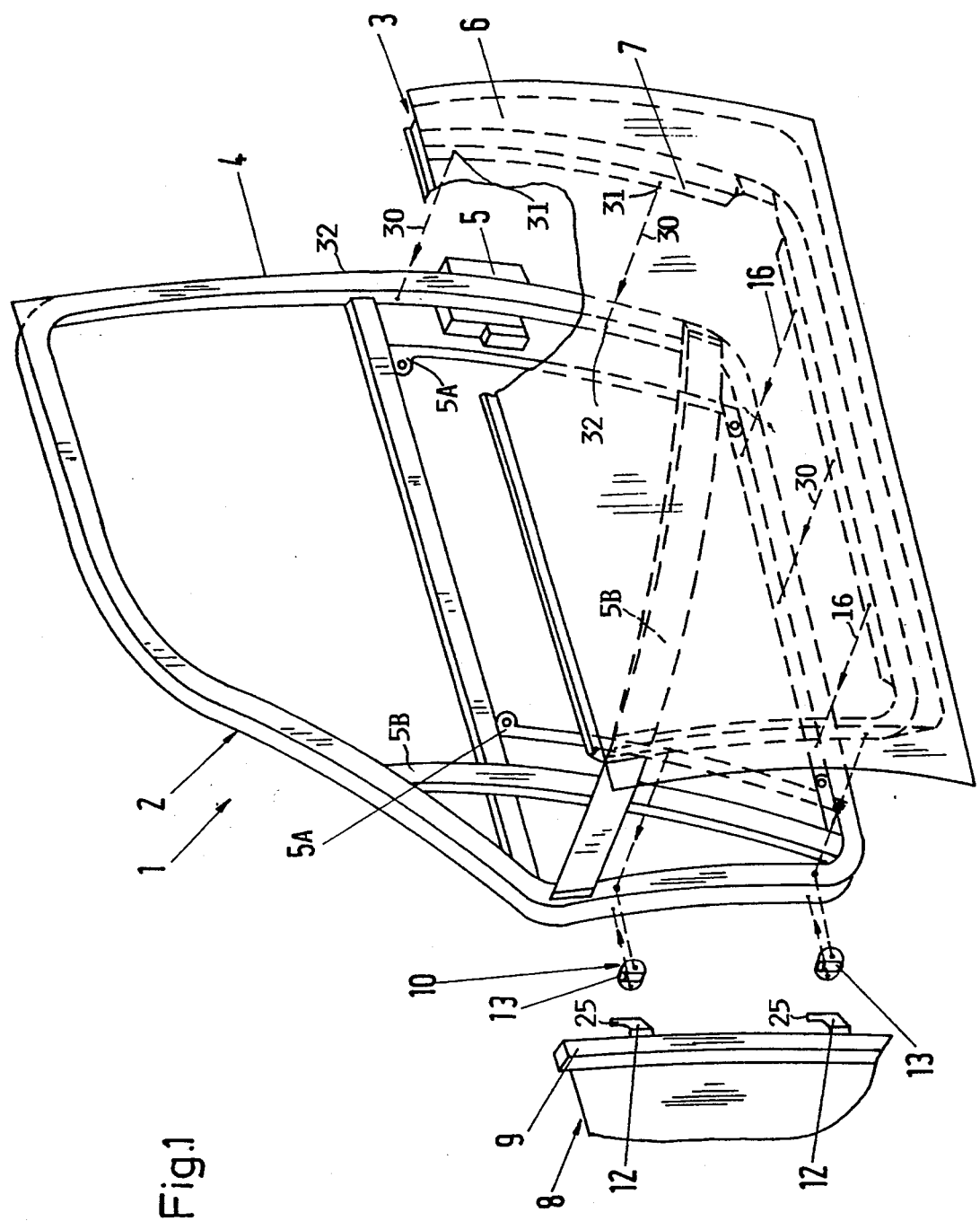
FIG. 1 is a perspective view of the essential components of the door according to the invention, forming two separate modular units.
Figure 2:
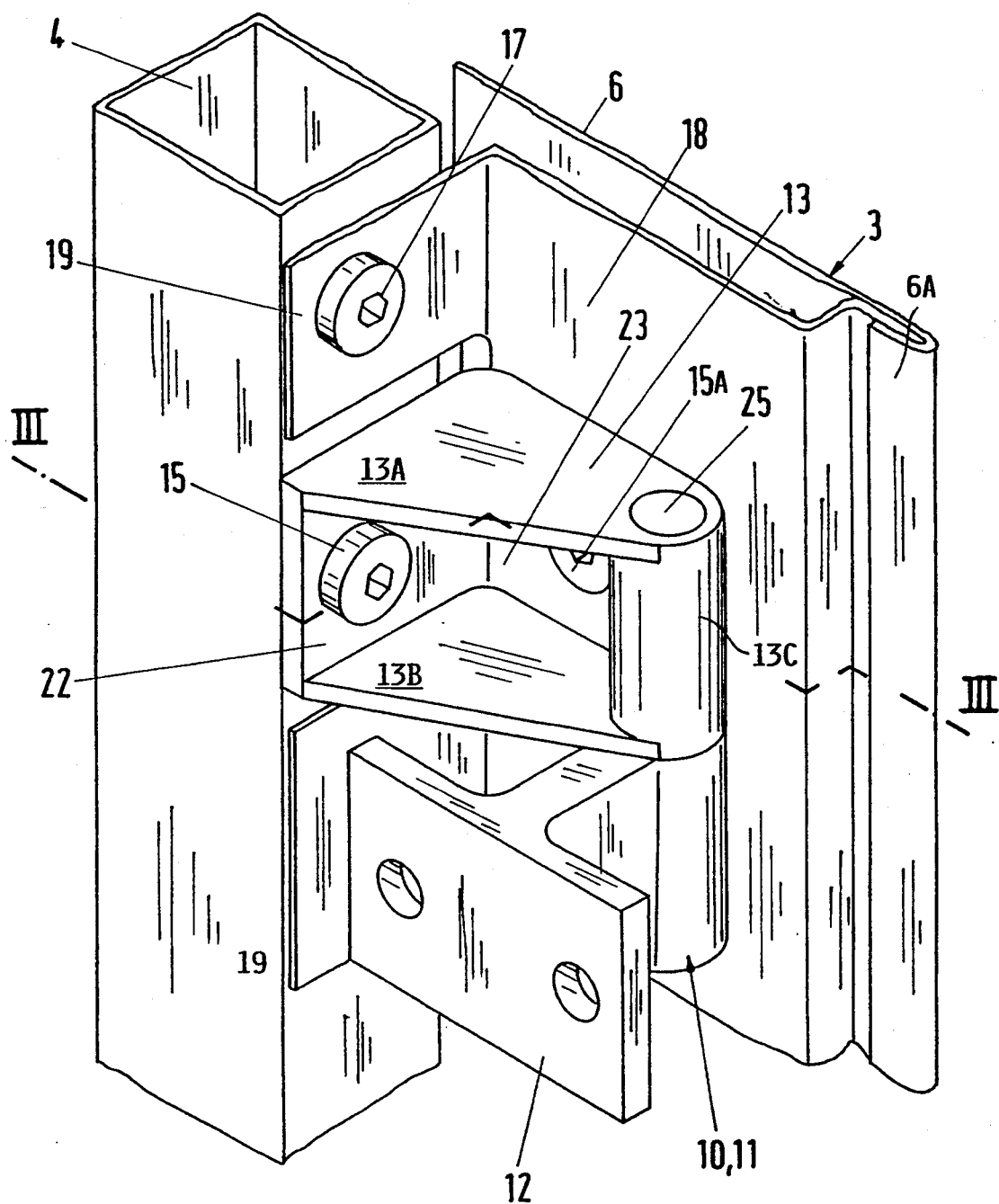
FIG. 2 is a perspective view of a first hinge construction according to the invention showing in a broken away manner how the door frame forming part of the inner modular unit and the outer modular unit are separately and releasably connectable to the door hinge section.

FIG. 1 shows in a perspective view a motor vehicle door 1 according to the invention comprising a first or inner modular unit 2 that includes a door frame 4 and functional components for operating the door, such as a door lock 5, a window operating mechanism 5A and the like. The frame may include one or more cross braces 5B and functions as a door support or door brace. The present door further includes an outer or second modular unit 3 comprising an outer door skin 6 and elements 7 for securing the modular unit 3 independently to the door frame 4, for example, by symbolically shown screws 30 passing through screw holes 31 in the outer modular unit 3 and screw holes 32 in frame 4 at locations 16. In the left-hand part of FIG. 1 an A-column 9 and a sheet body portion 8 are shown. The column A forms part of a vehicle frame. Frame hinge sections 12 are conventionally secured to the A-column 9. Door hinge sections 10, 11 are secured to the door frame 4 and to the outer modular unit 3 as will be described in more detail below. The door hinge sections 10, 11 comprise a hinge bushing 13 adapted to receive a hinge pin 25 of the frame hinge section 12. First and second connecting devices 14, 15 and 14A, 15A, shown in FIG. 3 connect the two modular units to the frame 4 as shown in FIG. 2, for example. Referrring to FIGS. 2 and 3 in conjunction, connecting elements 14 and 15 secure the first modular unit 2 or more specifically, the door frame 4 of the first modular unit 2, to a hinge section 10 or 11. Second connecting elements 14A and 15A connect the second outer modular unit 3 to the same door hinge section, however, separately and independently of the first mentioned connection of the inner modular unit. An element that performs the function of a nut 15C has an initial outer diameter that fits through the through-hole 14 and through a respective through-hole in the door frame 4. When the screw 15 is tightened, a bucking bulge 15D is formed to tightly secure the door hinge section to the frame 4. A nut 15B is initially secured to a sheet metal member 18 of the outer modular unit 3 and cooperates with the screw 15A for securing the outer modular unit 3 to the door hinge section. Thus, it is clear, that for example, the outer modular unit 3 is easily removable from the hinge section by loosening the screw 15A, whereby the removal is completely independent of any connection between the frame 4 and the respective door hinge section or leg.

In addition to the connections just described, the outer modular unit 3 is connected at further locations 16 to the door frame by the above mentioned connecting element 30, 31, 32. For this purpose, the outer skin 6 is provided with the above mentioned sheet metal member 18 that is, for example, crimped at 6A to the outer skin 6 of the outer modular unit 3. The elements 16, 30, 31, 32 form third connecting elements which may include additional connecting screws 17 for securing an angled tab 19 of the sheet metal member 18 directly to the door frame 4 as shown in FIG. 2. The sheet metal member 18 may have several of such tabs 19.

Figure 3:
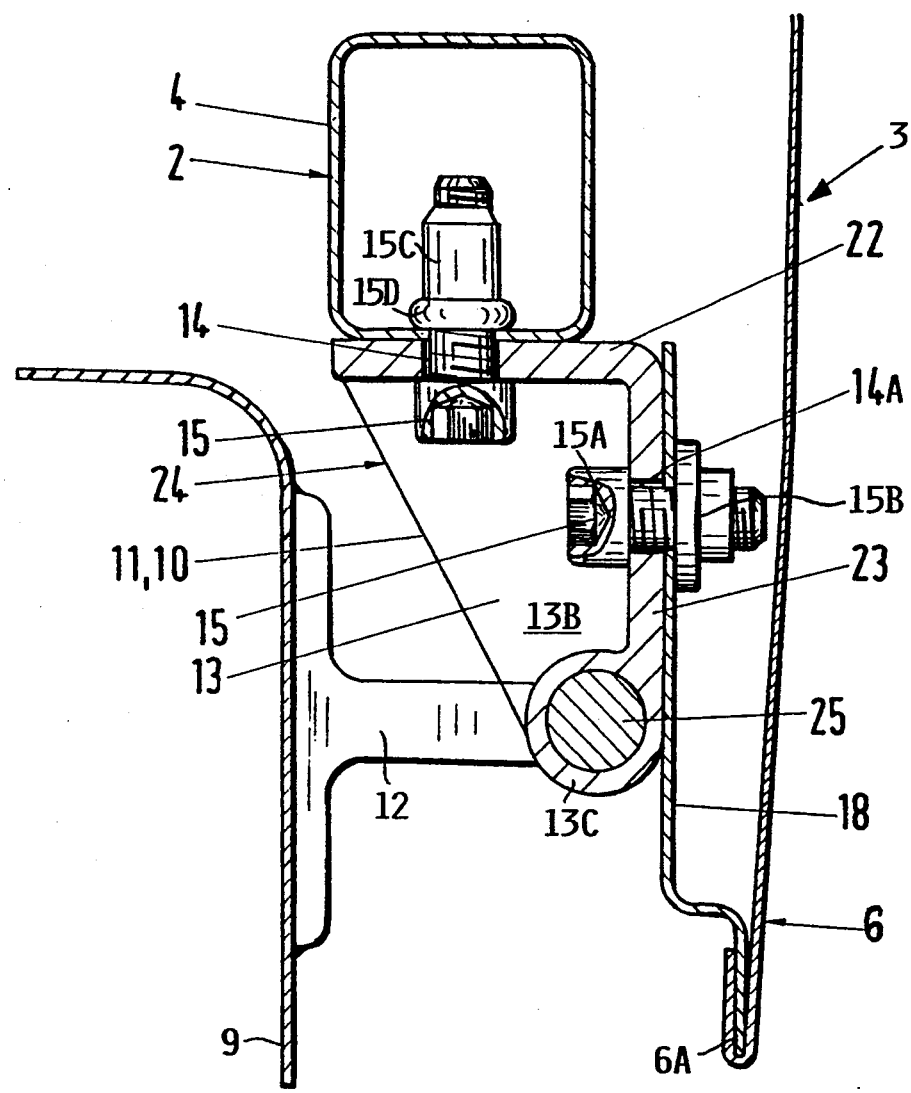
FIG. 3 is a sectional view along section line III—III in FIG. 2.

FIG. 2 further shows that the door hinge section 13 is an angular section having a first leg 22 secured to the frame 4 by the screw 15 as described and a second leg 23 secured to the sheet metal member 18 by the screw 15A as shown in FIG. 3. The leg 23 has attached thereto a hinge bushing 13C that is further connected to first and second wall sections 13A and 13B which form with the legs 22 and 23 and with the hinge bushing 13C a box that has a cross-sectional configuration best seen in FIG. 3. The holes 14 and 14A are large enough to permit for manufacturing tolerance adjustments.

Figure 4:
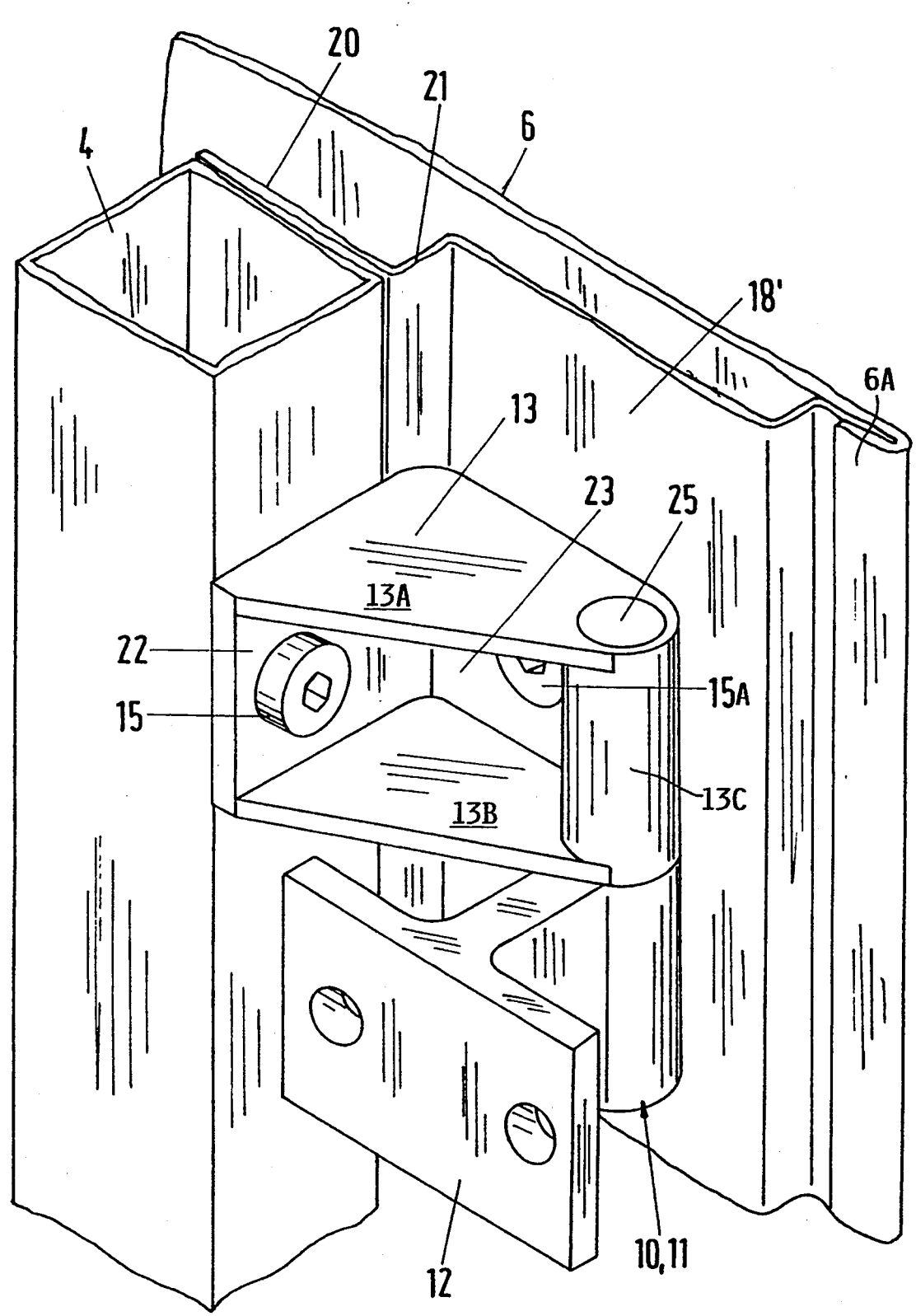
FIG. 4 is a perspective view similar to that of FIG. 2, however, showing a modification in which the outer modular unit is not directly connected to the door frame, but only to the door hinge section.

FIG. 4 shows an embodiment which is substantially similar to the embodiment of FIG. 2 and FIG. 3 with the difference that the sheet metal member 18' does not have angular tabs 19. Instead, the sheet metal member 18' has a flat section 20 cranked at 21 so as to form the cross-sectional configuration best seen in FIG. 4. The section 20 rests positively against the frame 4, thereby permitting the adjustment of the outer skin 6 relative to the door hinge section 13 with the aid of the over-dimensioned hole 14A. The proper positioning of the modular units relative to each other may further be aided by washers and shimming inserts, not shown, but of conventional construction.

As mentioned above, the first and second connecting means or elements are screws passing through over-dimensioning screw holes. FIGS. 2, 3, and 4 also show how the hinge pin 25 of the frame hinge section 12 passes through the hinge bushing 13C. Although the hinge bushing 13C is shown in FIGS. 2, 3, and 4 positioned at the outer end of the section leg 23, the invention is not limited to such position of the hinge bushing 13C. Any position that will permit the proper operation and hinging of the door is satisfactory. Incidentally, in the figures, the door will be opened by hinging clockwise about the hinge pin 25.

Figure 5:
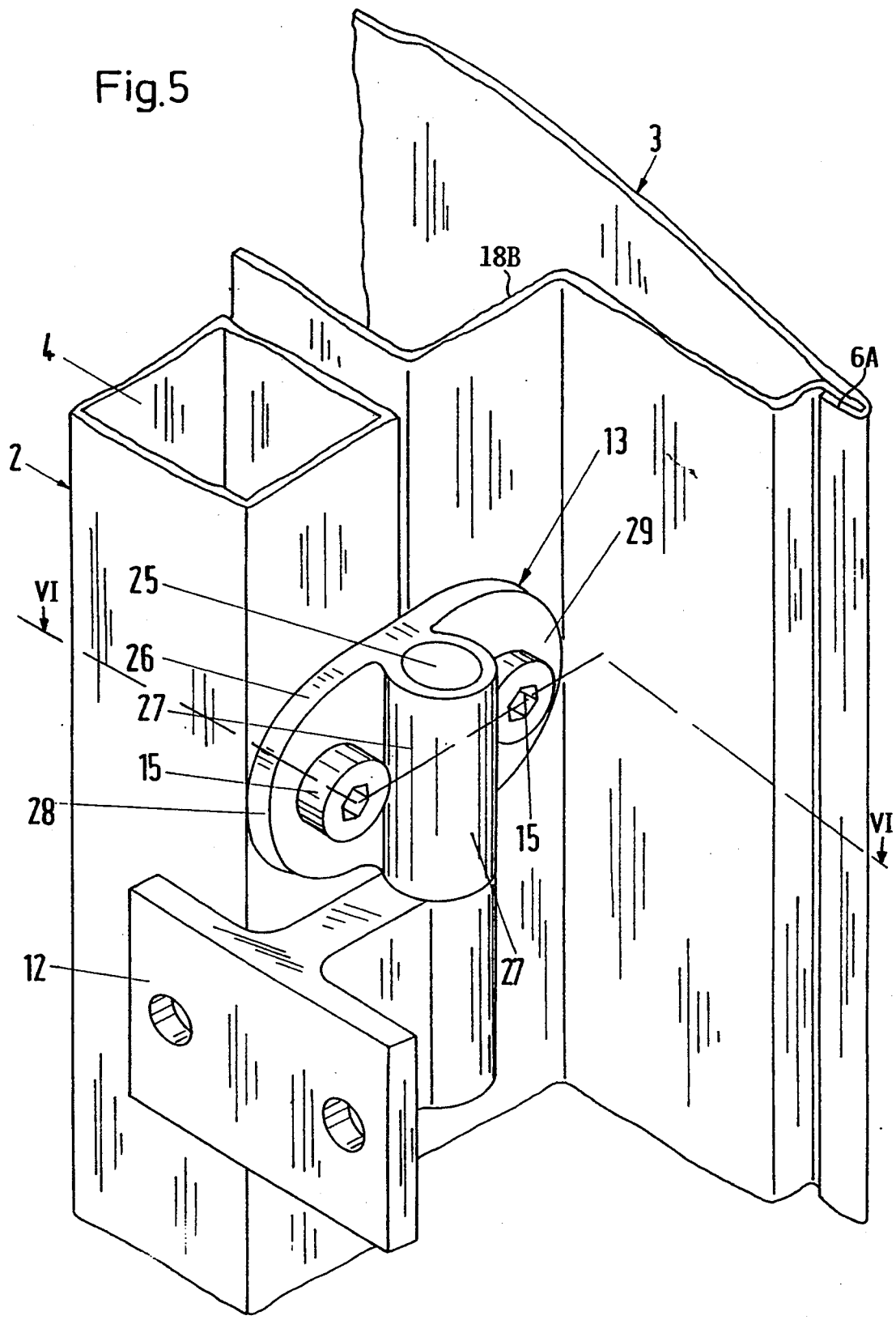
FIG. 5 is a perspective view similar to that of FIG. 2, but showing a further embodiment of the invention in which the door hinge section has a T- or Ω- cross-sectional configuration.
Figure 6:
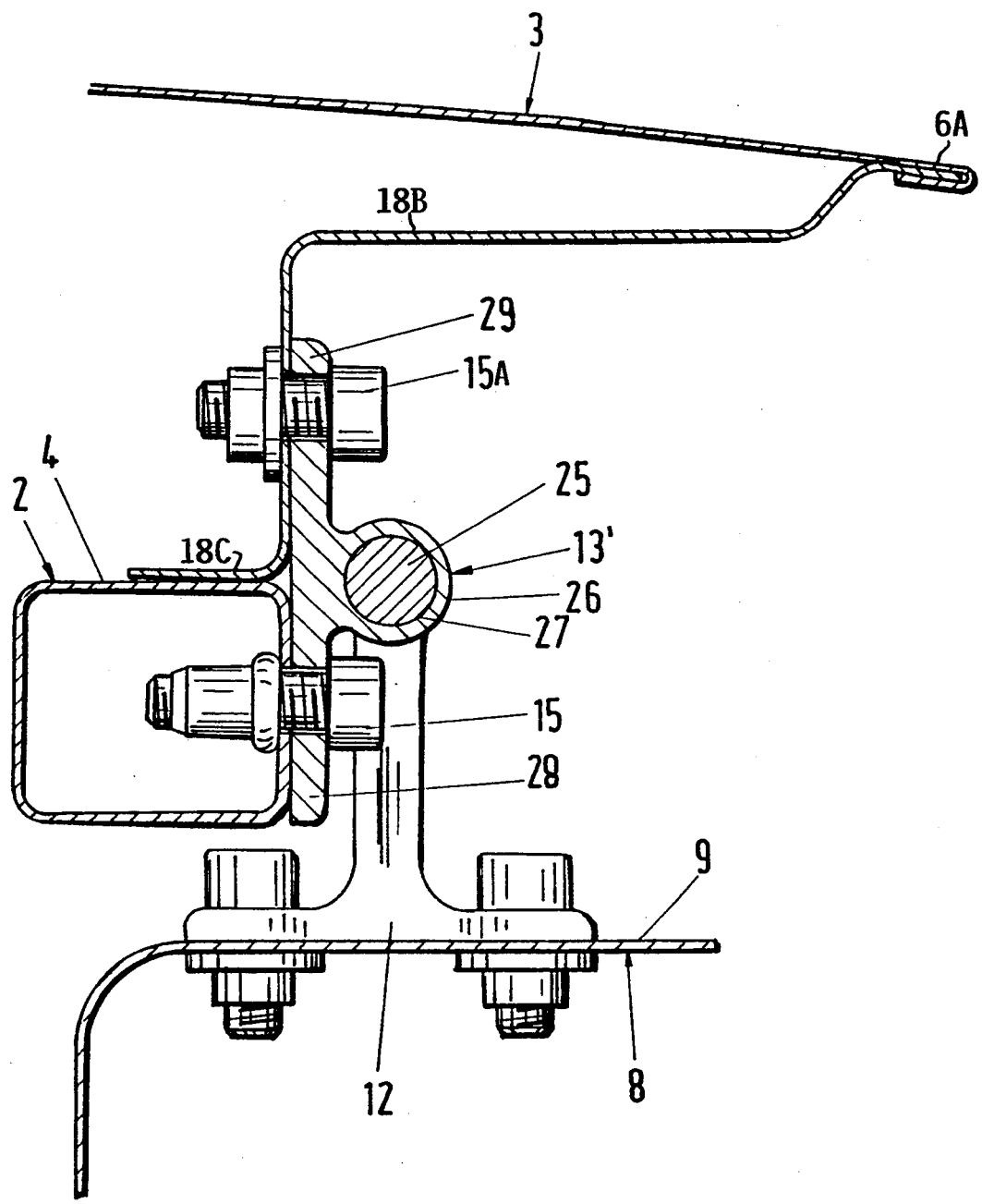
FIG. 6 shows a sectional view along section line VI—VI in FIG. 5.

In the embodiment of FIGS. 5 and 6, the door hinge section 13' has another configuration compared to the embodiments described above. The door hinge section 13' has a somewhat T- or Ω cross-sectional configuration, whereby the hinge bushing 26 forms a loop with a central bore in which the hinge pin 25 is received. The loop of the hinge bushing 26 is rigidly secured to or forms part of a head portion having two legs 28 and 29. The screws 15 and 15A again pass through respective over-dimensioned holes so that the desired adjustment for compensating manufacturing tolerances is possible. The sheet metal member 18B has an inverted Z-configuration so that a leg 18C rests adjustably against a wall of the door frame 4. The two legs 28 and 29 of the head portion of the door hinge section extend in a common plane and preferably have an oval configuration best seen in FIG. 5. However, the arrangement of these legs 28, 29 in a common plane is not critical. Rather, other configurations for these legs may be chosen to accommodate the connection of the two modular units to the door hinge section independently of one another. The same considerations apply to the frame hinge sections 12 and to the formation of the hinge bushings 13C and 26. It is, however, important that it is possible to independently and releasably connect each modular unit 2 and 3 to the door hinge sections as described. The separate disconnection of the door modular units from the respective hinge sections provides the above mentioned advantages of the invention, especially with regard to the assembly and repair of doors. The assembly of the modular units 2 and 3 may now take place separately even on separate assembly lines.

Although the invention has been described with reference to specific example embodiments, it will be appreciated that it is intended to cover all modifications and equivalents within the scope of the appended claims.

What we claim is:

1. A motor vehicle door, comprising a first inner modular unit and a second outer modular unit, said first modular unit comprising a door frame and at least one function element secured in said door frame, said outer modular unit comprising a door cover skin and means for securing said door cover skin to said door frame, said vehicle door further comprising at least one door hinge section for securing said vehicle door to a frame hinge section of a vehicle frame, first connecting means for releasably securing said inner modular unit to said door hinge section, and second connecting means for releasably securing said outer modular unit to said door hinge section.

2. The vehicle door of claim 1, wherein at least one of said first and second connecting means is adjustable for compensating manufacturing tolerances.

3. The vehicle door of claim 1, wherein at least one of said first and second connecting means comprises a through-hole, a screw passing through said through-hole, and a nut for securing to said door hinge section.

4. The vehicle door of claim 3, wherein said through-hole passes through said door hinge section and has a hole diameter larger than a diameter of said screw, and wherein said nut is secured to at least one of said door frame and said outer modular unit.

5. The vehicle door of claim 1, further comprising third connecting means for releasably securing said outer modular unit to said inner modular unit.

6. The vehicle door of claim 5, wherein said third connecting means comprise a screw connection (30, 31, 32).

7. The vehicle door of claim 1, wherein said door hinge section comprises an angular profile section having a first leg connectable to said door frame and a second leg connectable to said second modular unit.

8. The vehicle door of claim 7, wherein one of said first and second legs of said door hinge section comprises a hinge bushing (13C) substantially opposite the other of said first and second legs, said hinge bushing being adapted for connection to said frame hinge section of said vehicle frame.

9. The vehicle door of claim 7, further comprising first and second wall sections covering said angular profile section at each end of said angular profile section. (Wall sections 13A, 13B).

10. The vehicle door of claim 9, wherein said wall sections have a substantially triangular configuration.

11. The vehicle door of claim 10, further comprising a hinge bushing secured to one of said first and second legs of said angular profile section, and wherein one corner of each of said triangular wall section merges into said hinge bushing.

12. The vehicle door of claim 1, wherein said door hinge section comprises a profile section having an approximately T-crosssectional configuration including a head portion and a hinge bushing (13') secured to said head portion for connection to said frame hinge of said vehicle frame.

13. The vehicle door of claim 12, wherein said hinge bushing (13') of said T-cross-sectional configuration is secured centrally to one side of said head portion, said head portion having two arms (28, 29), one arm being connected to said door frame of said first modular unit, the other arm being connected to said second modular unit.

14. The vehicle door of claim 12, wherein said head portion has an oval configuration, and wherein said hinge bushing (27) is secured centrally to one side of said oval configuration.

15. The vehicle door of claim 1, wherein said first and second connecting means are independent of each other.

16. A motor vehicle door, comprising a first inner modular unit and a second outer modular unit, said first modular unit comprising a door frame and at least one function element secured in said door frame, said outer modular unit comprising a door cover skin and means for securing said door cover skin to said door frame, said vehicle door further comprising at least one door hinge section for securing said vehicle door to a frame hinge section of a vehicle frame, first and second screw connector elements for independently securing said first modular unit to said door hinge section and said second modular unit also to said door hinge section independently of said first modular unit.

17. The motor vehicle door of claim 16, wherein said at least one function element is a door lock mounted to said door frame.

18. The motor vehicle door of claim 16, wherein said at least one function element is a door window lifting mechanism mounted in said door frame.

* * * * *